United States Patent [19]

Schaupp et al.

[11] 3,923,962
[45] Dec. 2, 1975

[54] PROCESS FOR EFFECTING CHEMICAL REACTIONS UNDER PRESSURE

[75] Inventors: Kurt Schaupp, Cologne; Manfred Schulze, Leverkusen, both of Germany

[73] Assignee: Bayer Aktiengesellschaft, Leverkusen, Germany

[22] Filed: Sept. 27, 1972

[21] Appl. No.: 292,580

[30] Foreign Application Priority Data
Oct. 2, 1971 Germany.......................... 2149313

[52] U.S. Cl. ................ 423/339; 423/341; 423/470; 423/489; 423/659; 23/252; 23/285
[51] Int. Cl........ C01c 1/16; C01b 33/12; C01g 1/00
[58] Field of Search ........... 423/339, 335, 659, 470, 423/335, 659 F; 23/285 X, 283 X, 284 X, 260

[56] References Cited
UNITED STATES PATENTS

| | | | |
|---|---|---|---|
| 1,919,943 | 7/1933 | Heath et al. ........................ | 423/470 |
| 2,898,290 | 8/1959 | Swabb, Jr. .................... | 423/659 F X |
| 3,271,107 | 9/1966 | Nickerson et al................... | 423/339 |
| 3,281,213 | 10/1966 | Waddill................................ | 23/285 |

FOREIGN PATENTS OR APPLICATIONS
791,154 2/1958 United Kingdom............ 423/659 F Primary Examiner—Edward Stern
Attorney, Agent, or Firm—Burgess, Dinklage & Sprung

[57] ABSTRACT

An apparatus for carrying out chemical reactions comprising a pair of substantially vertical pipes connected to one another adjacent their bottoms, means for supplying liquid to one of said pipes to maintain therein a liquid level, an overflow pipe connected to the second of said pipes at a level below the liquid level in said one pipe, and means for introducing at least one reactant to said one pipe below the liquid level therein, whereby the reaction is able to proceed under the pressure of the column of liquid in said one pipe, liquid and reaction product being continuously withdrawn. A heat exchanger may connect the two pipes adjacent their lower ends so that hot liquid in the second pipe can be cooled and recycled to the first pipe. The apparatus is especially suited for the reaction of ammonia and hexafluorosilicic acid to produce ammonium hexafluorosilicate.

3 Claims, 3 Drawing Figures

PROCESS FOR EFFECTING CHEMICAL REACTIONS UNDER PRESSURE

Chemical reactions, and particularly those taking place between liquid and gaseous or readily volatile components, are generally carried out in stirring vessels or similar apparatus. The reaction process and the apparatus in which it is carried out have to meet certain requirements, depending upon the nature of the reaction components, the reaction products and the necessary control of the reaction. For example, it is necessary in many cases to apply an increased pressure to ensure that the reaction proceeds both in the required direction and with the requisite velocity. The pressure required is supplied either by the reaction medium itself (particularly at elevated temperature) or by applying an external pressure. In many fields, pressure apparatus is used for this purpose. However, apparatus of this kind involves considerable technical outlay and, furthermore, is generally extremely prone to trouble.

It is accordingly an object of the present invention to provide a simple apparatus and process for continuously carrying out chemical reactions under pressure in which the reactants can be present in any state, wherein the reaction is carried out in the absence of an external pressure.

These and other objects and advantages are realized in accordance with the present invention pursuant to which the reaction is effected in a U-shaped reaction zone through which a liquid flows, the reactants being introduced at any point into one of the arms of the reaction zone while the reaction products together with the liquid are removed at the upper end of the other arm.

The invention also provides an apparatus for continuously carrying out reactions which are governed by pressure, the pressure favorably affecting the chemical reaction being generated by the action of a column of liquid situated above the reaction zone, wherein two pipes, namely a reaction pipe and an overflow pipe, are connected together on the principle of communicating pipes, and wherein the requisite pressure is generated by a column of liquid containing one or more reactants.

In one particular embodiment, intended particularly for carrying out highly exothermic reactions, the apparatus is designed in such a way that a component stream of the reaction mixture is removed from the overflow pipe and returned to the reaction pipe through a heat exchanger.

The reaction vessel according to the invention is essentially in the form of a U-shaped pipe which enables reactions to be carried out in the absence of external pressure by utilizing the hydrostatic pressure of the reaction mixture. More precisely, the present invention relates to an apparatus for continuously carrying out a chemical reaction under pressure which comprises a reaction pipe and an overflow pipe which are connected on the principle of communicating pipes to form a U-shaped reactor, at least one feed inlet for the reactants in the reaction pipe of the U-shaped reactor and an outlet at the upper end of the overflow pipe wherein pressure is applied to the reactants by a column of liquid in the reaction pipe of the reactor. The apparatus according to the invention is particularly suitable for carrying out reactions which take place in liquid medium and in which a readily volatile or gaseous component is consumed, and reactions in which an increase in boiling point is necessary during the reaction in the reaction zone. The technical outlay that is normally required for pressure apparatus can be avoided with the apparatus according to the invention. Moreover, it is also possible in continuous operation very simply to obtain extremely high volume-time yields in chemical reactions carried out over a very small surface area.

By virtue of the process and the apparatus according to the invention, it is also possible to obtain a particularly favorable residence time spectrum of the materials involved in the reaction.

The invention will be further described with reference to the accompanying drawings, wherein.

Figure 1:
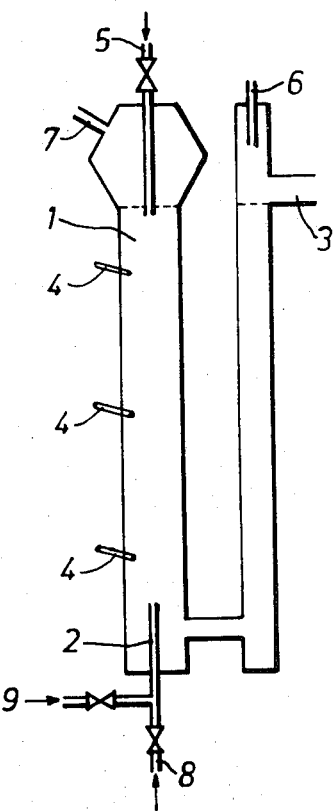
FIG. 1 is a schematic sectional view of an apparatus in accordance with the invention.

Referring now more particularly to the drawings, in FIG. 1 there is shown one embodiment of an apparatus according to the invention applied, for example, in the production of ammonium fluoride from hexafluorosilicic acid and $NH_3$. The apparatus suitable for this purpose consists essentially of two pipes joined together at their lower ends by a third pipe. Depending upon the excess pressure required, the height of the columns of the U-shaped pipe is selected in such a way that, when the vessel is placed in an upright position, a high hydrostatic pressure is formed, which favorably influences the reaction to proceed in the required direction.

In FIG. 1, the reference 1 denotes the reaction pipe, the reference 2 an immersion pipe, the reference 3 an overflow pipe, the reference 4 temperature-measuring points, the references 5, 8 and 9 feed and discharge pipes and the references 6 and 7 vents.

The process according to the invention for producing ammonium fluoride and $SiO_2$ is carried out substantially as follows by means of the apparatus according to the invention:

A solution of hexafluorosilicic acid is introduced at the upper end of the reaction pipe 1 of the U-shaped reactor and then flows countercurrent to the ammonia entering from below via an immersion pipe 2 either in the form of gaseous ammonia or in the form of an aqueous solution. Where gaseous ammonia is used, it has to be mixed with air in order to prevent excessive vibration through condensation shocks. The reaction zone can be set up in any required part of the reaction pipe by varying the quantity of ammonia introduced. Strictly therefore the reactor is U-shaped but reaction only takes place in a portion of the reactor. However, it is advisable, in order to generate as high a hydrostatic excess pressure as possible, to set up the reaction zone in the lower part of the reaction pipe. The addition of ammonia is measured in such a way that the suspension of silica in ammonium fluoride solution issuing from the upper end of the narrower overflow pipe 3 has a pH value in the range of about 7 to 10. It has been found that, for a column height of 7 meters (which corresponds to an excess pressure in the reaction zone of substantially 0.8 atmospheres) and a pH value of 8.5, the filtered ammonium fluoride solution had an $SiO_2$-content of less than 1.5 g/l. The silica can be filtered particularly effectively when the reaction in the apparatus according to the invention takes place at temperatures in the range of about 60° to 90°C.

Figure 2:
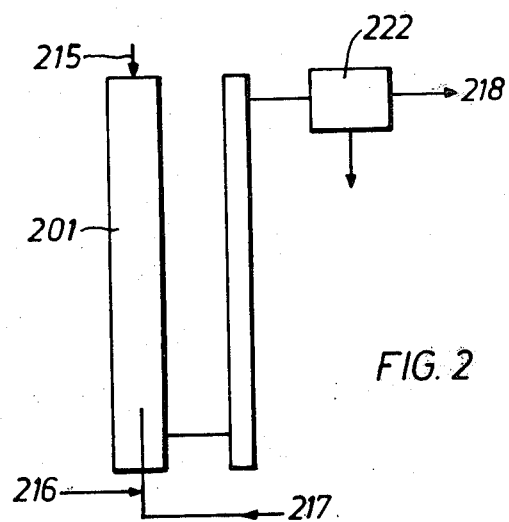
FIG. 2 is a schematic view of another apparatus.

FIG. 2 is a flow sheet for the production of ammonium fluoride and silica from hexafluorosilicic acid and ammonia in which the apparatus according to the invention is used as the reaction vessel. On completion of the reaction in the reaction vessel 201, the silica is separated from the ammonium fluoride solution in a filter 222. The process is carried out by introducing approximately 20 percent $H_2SiF_6$ at 215, $NH_3$ gas or an aqueous solution of $NH_3$ in water at 217 and air at 216. An approximately 25 percent ammonium floride solution is removed at 218 which can then be further processed.

In one particularly favorable embodiment of the apparatus according to the invention, means are provided for the rapid dissipation of heat so that it is also possible to control reactions in such a way that even relatively large quantities of heat can be released.

Figure 3:
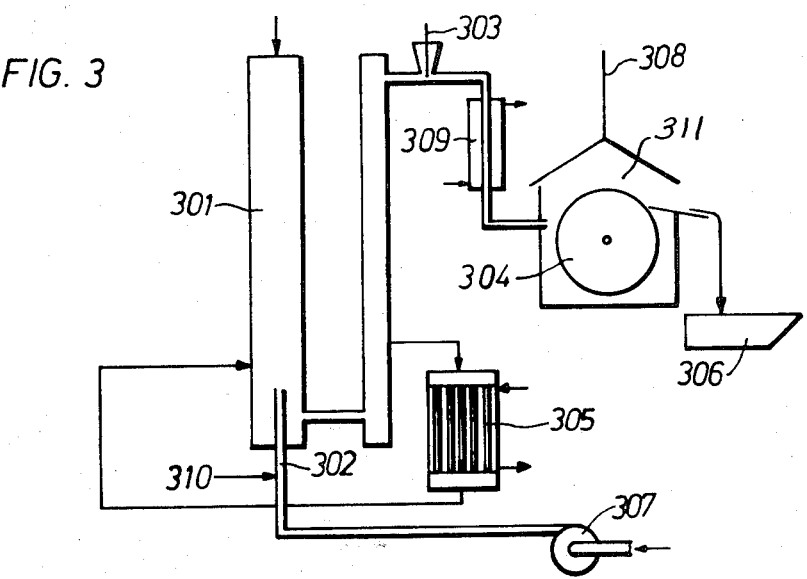
FIG. 3 is a schematic view of still another embodiment of apparatus.

An apparatus of this kind is illustrated in FIG. 3. Because of the exothermic nature of the reaction (in the reaction of $H_2SiF_6$ with $NH_3$, approximately 50 kcal are released per mole of $H_2SiF_6$), heat has to be dissipated from the U-shaped reactor. Since the heat cannot be dissipated through the wall of the reaction pipe alone because of the large accumulation of heat at corresponding reaction velocity, a component stream of the reaction mixture has to be removed from the overflow pipe and returned via a condenser to the reaction vessel through the reaction pipe.

The hexafluorosilicic acid enters the reaction pipe of the U-shaped reactor 301 at its upper end and reacts in the lower half of the reactor with the ammonia issuing from the pipe 302. At the same time, air is blown into the pipe 302 at 310. Where aqueous ammonia solution is used, this is introduced under pressure via the pump 307 into the reactor through the pipe 302, so that there is no need for air to be added. For cooling, the reaction mixture is forced by a pump out of the overflow pipe into the tubular condenser 305 from which it is returned to the reaction pipe 301. The addition of ammonia is controlled through the pH-value which is measured at the upper end of the overflow pipe of the reactor at 303. From here, the reaction mixture is cooled to 30°C in the condenser 309 and then enters the rotary filter 304 provided with a suction attachment 308 on which the silica is separated and washed.

The water used for washing is introduced at 311. The silica which accumulates is collected in the collecting vessel 306, and is found to have a water content of approximately 40 per cent. By virtue of its high reactivity, it is particularly suitable for the production of waterglass.

The filtrate leaves the filter for further processing. The ammonia formed can be returned to the U-shaped reactor through the pump 307 and the pipe 302 either in gaseous form (admixed with water vapor) or in the form of an approximately 25 to 30 percent condensate.

The apparatus according to the invention can also be equipped with stirrers which can be arranged in one or both arms of the U-shaped reaction zone. Stirrers of this kind are necessary for ensuring thorough admixture of the reactants and for preventing solids from settling. Furthermore, it is also possible to provide, for example on the stirrer shafts, fittings which strip any crust-like or cake-like deposits adhering to the walls, thus ensuring that the reaction takes place in the absence of friction.

The apparatus according to the invention can be constructed from any materials, the choice of the materials being governed by the type of reactants and by the environmental and reaction conditions prevailing.

The process and apparatus according to the invention are by no means confined in their application to the reaction that has been particularly described. Any reactions taking place under similar conditions can be carried out in accordance with the invention. For example, the reaction of hexafluorosilicic acid with aluminum hydroxide to form aluminum floride or the reaction of polyalcohols with ethylene oxide or with propylene oxide, can be carried out by the process according to the invention. It is also possible in accordance with the invention to carry out polyaddition reactions of isocyanates with polyhydroxy compounds in readily volatile solvents, or quaternizing reactions with ethyl bromide.

The process according to the invention is further illustrated by the following Examples:

EXAMPLE 1

445 kg/h of $H_2SiF_6$, dissolved in 957 kg/h of water (31.8 percent solution) were reacted in the U-shaped reactor according to FIG. 2 of the invention with 1170 kg/h of a 30 percent ammonia solution under the hydrostatic pressure of a 7 meter column of liquid at a temperature of 70°C and at a pH-value of 8.7. The resulting $NH_4F$ solution (675 kg/h of $NH_4F$) contained 0.123 percent of $SiO_2$.

EXAMPLE 2 (Reaction with gaseous ammonia)

400 kg/h of $H_2SiF_6$ in 1600 kg of $H_2O$ were reacted in the U-reactor according to FIG. 2 of the invention with 315 kg/h of $NH_3$ at a temperature of 70°C and a pH-valve of 9. 15 l/h of air were introduced with the ammonia into the U-pipe. The $NH_4F$ solution (605 kg/h) freed from the $SiO_2$ (160 kg/h) by filtration had an $SiO_2$ content of 0.145 percent.

It will be appreciated that the instant specification and examples are set forth by way of illustration and not limitation, and that various modifications and changes may be made without departing from the spirit and scope of the present invention.

What is claimed is:

1. A process for continuously carrying out a chemical reaction in a U-shaped reaction zone under pressure but in the absence of externally applied pressure, said reaction requiring an increase in boiling point during reaction and involving at least one gaseous or readily volatile reactant, which comprises establishing a column of liquid in one of the legs of said U-shaped reaction zone, the height of said column of liquid establishing the pressure for said reaction, introducing the reactants into said column of liquid, at least one of the reactants being introduced into said column of liquid below its top, continuously adding liquid to said one leg, advancing it past the point of introduction of said one reactant along the connection with the other leg of said U-shaped reaction zone, and withdrawing liquid together with reaction product contained therein from adjacent the top of the other leg of said U-shaped reaction zone.

2. A process according to claim 1, wherein the reactants are ammonia and hexafluorosilicic acid and the reaction product is ammonium fluoride and silica, the ammonia being introduced into said column of liquid below its top.

3. A process according to claim 1, wherein a sidestream of liquid is tapped in said other column below the top, said liquid is subjected to heat exchange and is recycled to said one leg below its top.

\* \* \* \* \*